(12) United States Patent
Huang

(10) Patent No.: US 6,644,124 B2
(45) Date of Patent: Nov. 11, 2003

(54) VACUUM AND PRESSURE TEST ASSEMBLY

(76) Inventor: Chi-Chieh Huang, No. 7, Lane 38, Lei Jung St., Taichung (TW)

(*) Notice: Subject to any disclaimer, the term of this patent is extended or adjusted under 35 U.S.C. 154(b) by 19 days.

(21) Appl. No.: 10/104,532

(22) Filed: Mar. 25, 2002

(65) Prior Publication Data

US 2003/0177816 A1 Sep. 25, 2003

(51) Int. Cl.[7] .............................. G01L 7/08; G01L 7/16; G01L 7/00
(52) U.S. Cl. ............................... 73/715; 73/744; 73/756
(58) Field of Search ........................... 73/715, 744, 756

Primary Examiner—Hezron Williams
Assistant Examiner—J L P

(74) Attorney, Agent, or Firm—Charles E. Baxley

(57) ABSTRACT

A test assembly includes a valve and a piston received in a casing. The valve includes a main passage and a flexible seal film is mounted to an end of the valve. The seal film seals the main passage and has two apertures. A radial passage is defined through the valve and communicates with the main passage. A sub-passage is located in parallel with the main passage and communicates with the radial passage and one of the apertures of the seal film. A control member is rotatably and radially inserted in the valve and has a first path radially through the shank of the control member and communicates with the main passage. A second path is defined in half way of the shank and communicates with the first passage.

4 Claims, 6 Drawing Sheets

VACUUM AND PRESSURE TEST ASSEMBLY

FIELD OF THE INVENTION

The present invention relates to a vacuum and pressure test assembly includes a control member rotatably inserted into the valve and two passages are defined through the control member so as to communicate with the holes in the valve for different tests.

BACK GROUND OF THE INVENTION

A conventional vacuum test assembly is shown in FIG. 6 and includes a casing 10 in which a piston 17 is movably received therein and a valve 11 is received. A gauge 12 is connected to the valve 11 and a passage 13 is defined in the valve 11. A recess 14 is defined in an end of the valve, 11 and a seal film 15 is put at the end of the valve 11 and seal the opening of the passage 13 at the end of the valve 11. A spring clamp 16 is engaged with the recess 14 to position the seal film 15. The piston 17 is moved toward the valve 11 to press the seal film 15 onto the opening and the seal film 15 is pulled away from the opening of the passage 13 when the piston 17 is moved away from the valve 11. It is experienced that the seal film 15 is easily to be deformed or broken and cannot seal the opening of the passage 13 so that it is replaced frequently. A special tool is required to remove the spring clamp 16 and this takes time. However, it needs another type of tool to check the pressure of the valve so that the test assembly has only one function is not satisfied by the users.

SUMMARY OF THE INVENTION

The present invention relates to a test assembly which comprises a casing having a valve and a piston received therein. The valve has a main passage defined longitudinally therethrough and a radial passage is defined radially through the valve and communicates with the main passage. A sub-passage is defined in the valve and in parallel with the main passage. The sub-passage communicates with the radial passage and opens to outside of the valve.

A flexible seal film is securely mounted to the valve and has two apertures defined therethrough, one of the two apertures is located in alignment with the sub-passage.

A control member has a shank which is inserted in the radial passage in the valve. A first path is defined radially through the shank and communicates with the main passage. A second path is defined radially in the shank and terminated at a half way of the shank. The first path communicates with the second path and an angle is defined between two respective axes of the first path and the second path. The second path is sealed by an inner periphery of the radial passage when the control member is located at a first position, the second path communicates with the sub-passage when the control member is located at a second position.

The primary object of the present invention is to provide a test assembly that has a control member which control the position of the first path and the second path in the control member to respectively communicate with the main passage and the sub-passage so that the test assembly can be used as a vacuum or pressure test device.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
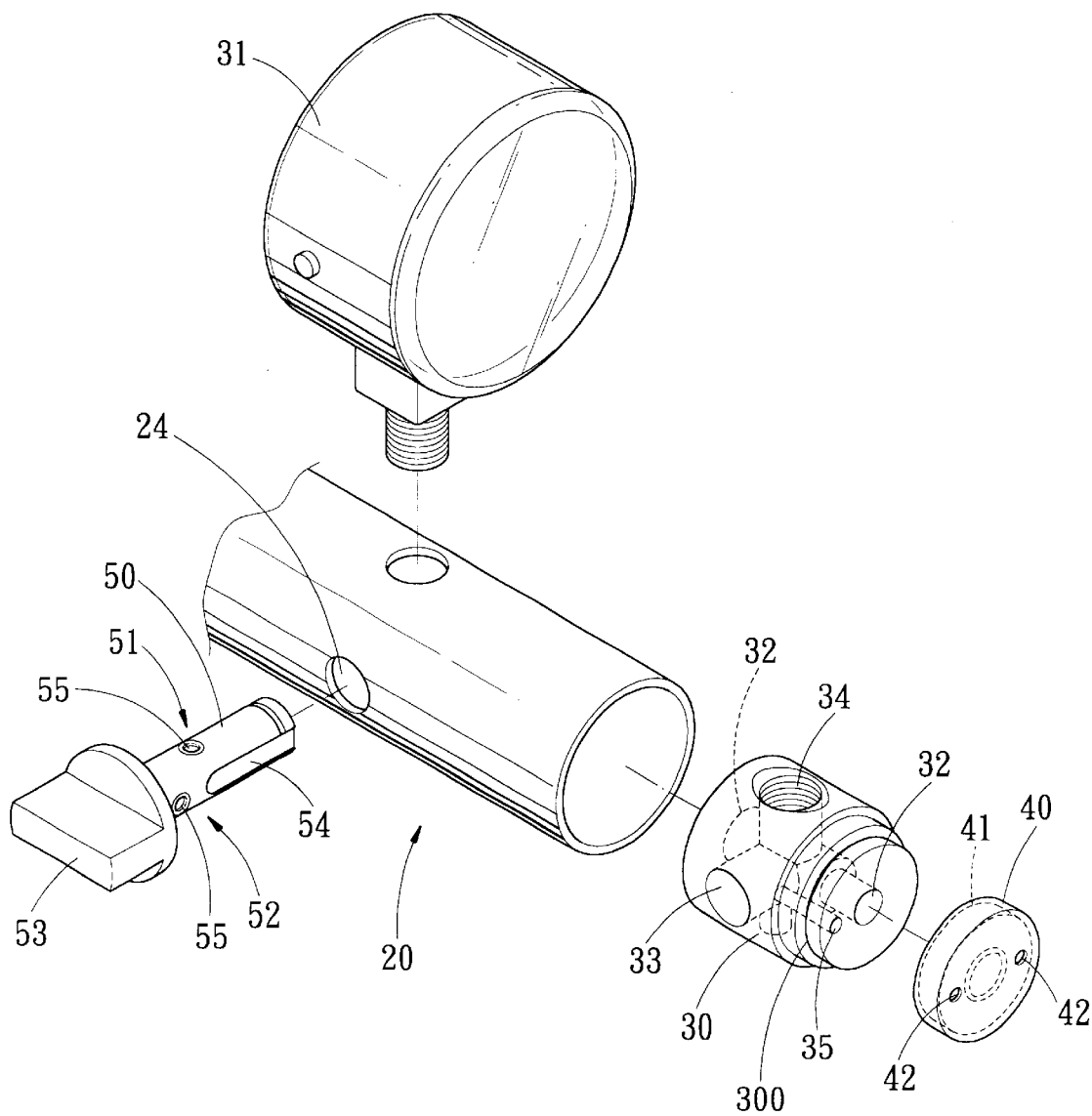
FIG. 1 is an exploded view to show the test assembly of the present invention.
Figure 2:
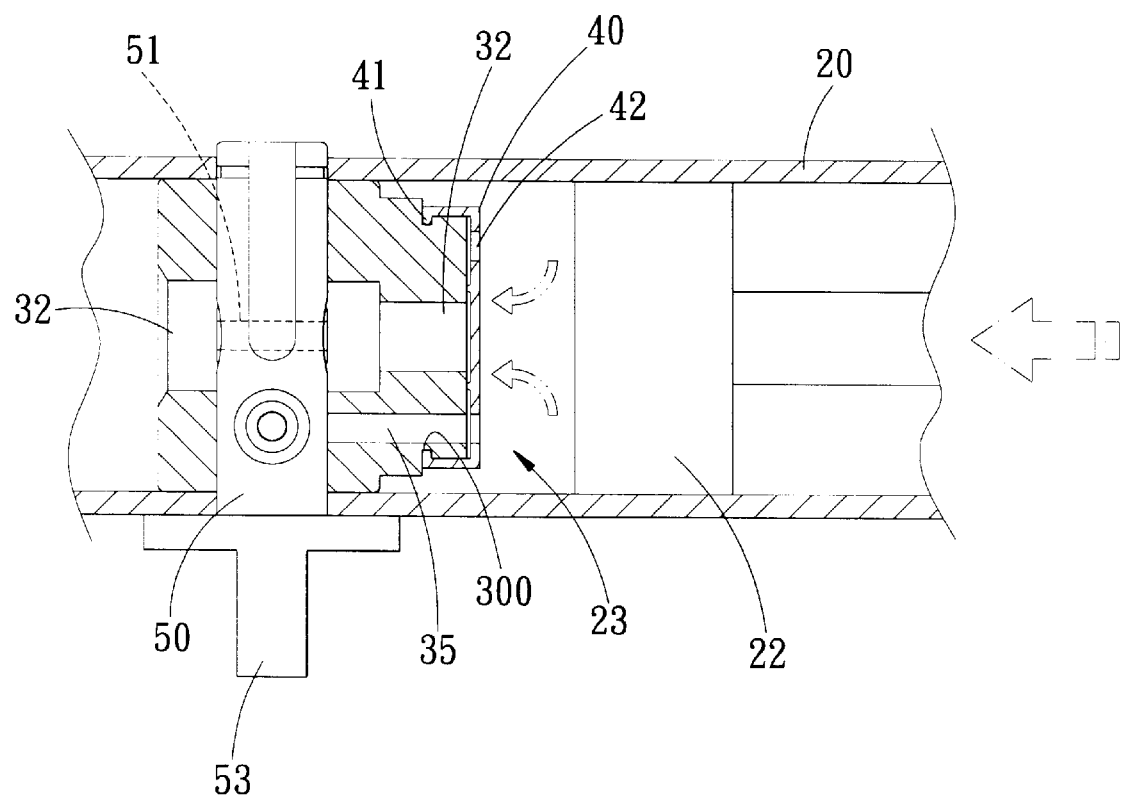
FIG. 2 is a cross sectional view to show when the control member is located at the first position and the piston is moved to ward the valve.

Referring to FIGS. 1 and 2, the test assembly of the present invention comprises a casing 20 having a valve 30 received therein and a piston 22 is movably received in the casing 20. The valve 30 has a main passage 32 defined longitudinally therethrough and an opening is defined in a first end of the valve 30. A radial passage 33 is defined radially through the valve 30 and communicates with the main passage 32. A sub-passage 35 is defined in the valve 30 and in parallel with the main passage 32. The sub-passage 35 communicates with the radial passage 33 and opens to the first end of the valve 30. A threaded hole 34 is defined radially in the valve 30 and a gauge 31 is threadedly connected to a threaded hole 34 defined radially in the valve 30. An annular groove 300 is defined in an outer periphery of the first end of the valve 30.

A flexible seal film 40 has a skirt which has a clamp flange 41 extending radially inward from an edge of the skirt portion and the clamp flange 41 is engaged with the annular groove 300 in the first end of the valve 30. Two apertures 42 are defined through the seal film 40 and one of the two apertures 42 is located in alignment with the sub-passage 35.

A control member 50 has a knob 53 and a shank which is inserted through a hole 24 in the casing 20 and received in the radial passage 33 in the valve 30. A first path 51 is defined radially through the shank and communicates with the main passage 32. One of two open ends of the first path 51 in the shank of the control member 50 is sealed by a seal 55.

A second path 52 is defined radially in the shank and terminated at a half way of the shank. The first path 51 communicates with the second path 52 and an angle is defined between two respective axes of the first path 51 and the second path 52. An open end defined by the second path 52 in the shank of the control member 50 is sealed by another seal 55. A groove 54 is defined longitudinally in an outer periphery of the shank of the control member 50 and communicates with the main passage 32 and outside of the casing 20 when the control member is located at the second position as shown in FIG. 5.

Figure 3:
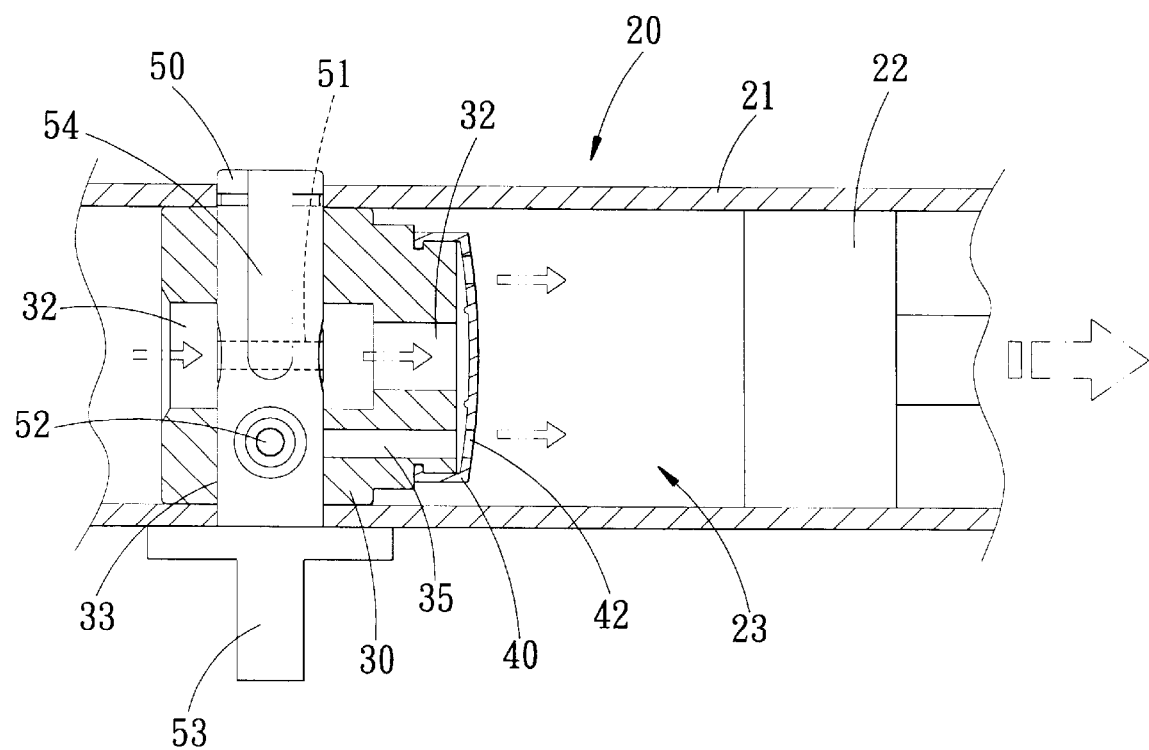
FIG. 3 is a cross sectional view to show when the control member is located at the first position and the piston is moved to away from the valve.

Referring to FIGS. 2 and 3, when the control member 50 is rotated to a first position, the second path 52 is sealed by an inner periphery of the radial passage 33 and the first path 51 communicates with the main passage 32. When the piston 22 is moved toward the valve 30, the main passage 32 is sealed by the seal film 40 and the sub-passage 35 is sealed by the shank of the control member 50. When the piston 22 is moved away from the valve 30, the seal film 40 is sucked away from the first end of the valve 30. Air passing through the main passage 32 is released from the two apertures 42.

Figure 4:
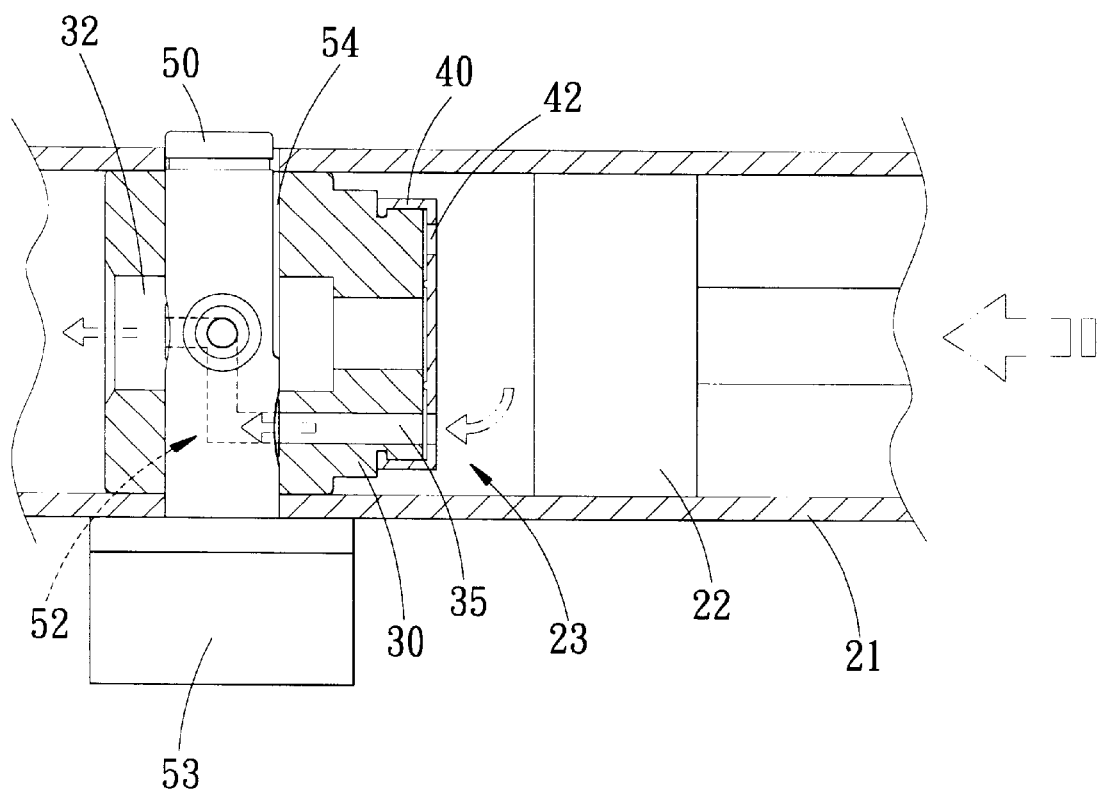
FIG. 4 is a cross sectional view to show when the control member is located at the second position and the piston is moved to ward the valve.
Figure 5:
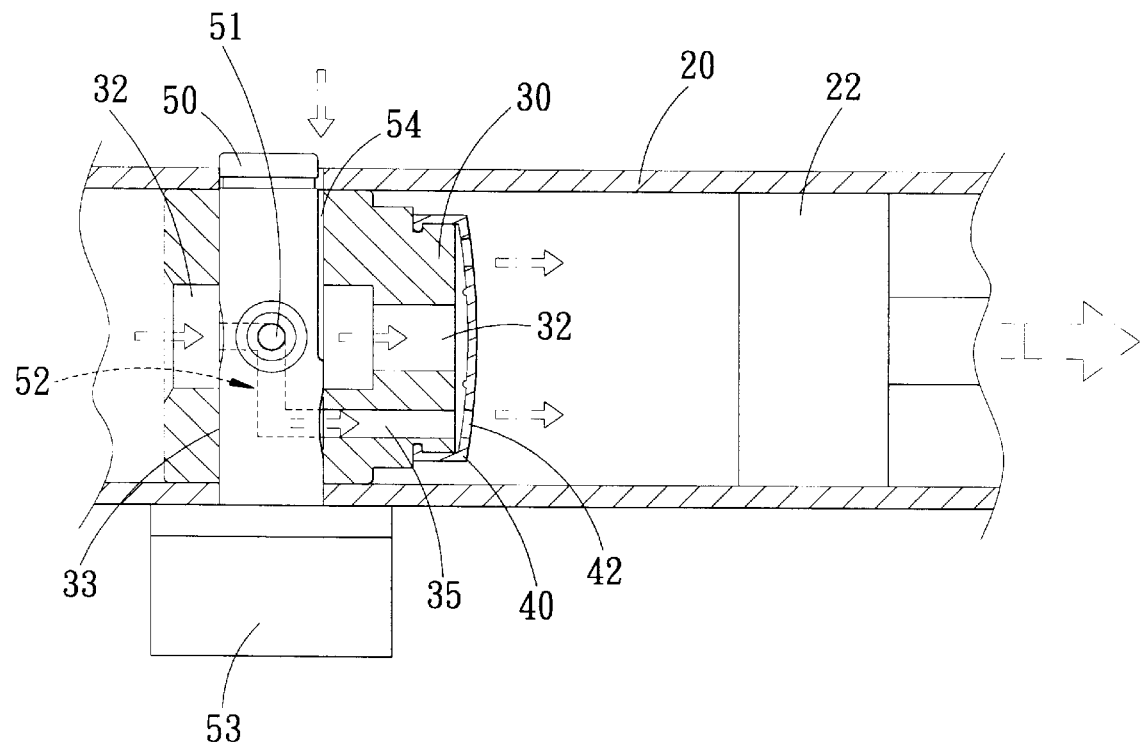
FIG. 5 is a cross sectional view to show when the control member is located at the second position and the piston is moved to away from the valve.
Figure 6:
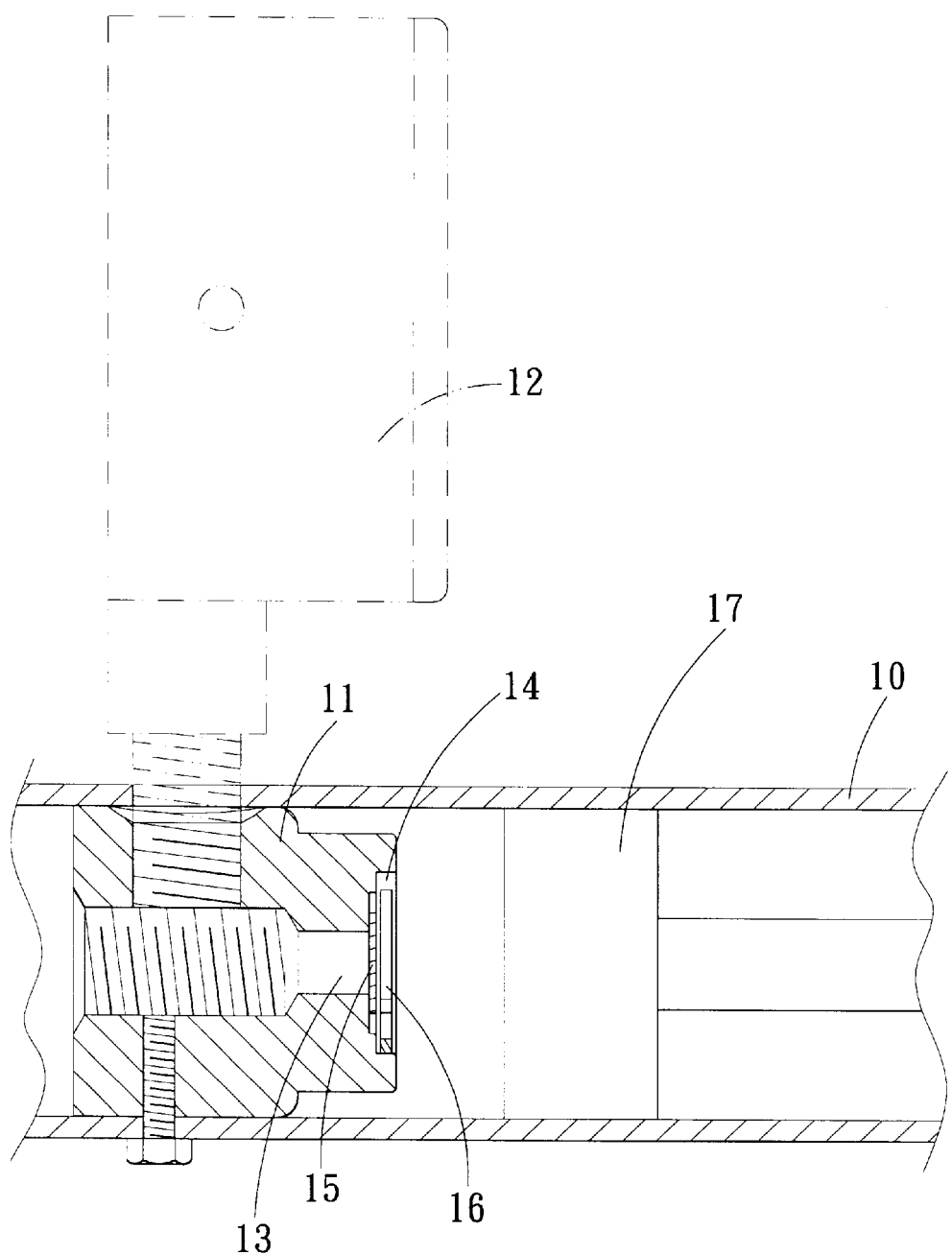
FIG. 6 is a cross sectional view to show a conventional test assembly.

Referring to FIGS. 4 and 5, when the control member 50 is rotated to a second position, the second path 52 communicates with the sub-passage 35, the first path 51 and the main passage 32. When the piston 22 is moved toward the valve 30, the main passage 32 is sealed by the seal film 40 and air enters in the sub-passage 35 via the aperture 42 that is located in alignment with the sub-passage 35. The air is then released from the main passage 32 via the second path 52 and the first path 51.

When the piston 22 is moved away from the valve 30, the seal film 40 is sucked away from the first end of the valve 30. Air passing through the main passage 32 is released from the two apertures 42 via the first path 51, the second path 52 and the sub-passage 35. Air outside the casing 20 enters in the groove 54 and the main passage 32, and is sucked out from the apertures 42.

While we have shown and described the embodiment in accordance with the present invention, it should be clear to those skilled in the art that further embodiments may be made without departing from the scope of the present invention.

What is claimed is:

1. A test assembly comprising:

a casing having a valve received therein and a piston movably received in the casing, the valve having a main passage defined longitudinally therethrough and defining an opening in a first end of the valve, a radial passage defined radially through the valve and communicating with the main passage, a sub-passage defined in the valve and in parallel with the main passage, the sub-passage communicating with the radial passage and opening to the first end of the valve, a threaded hole defined radially in the valve and a gauge connected to the threaded hole;

a flexible seal film securely mounted to the first end of the valve and having two apertures defined therethrough, one of the two apertures located in alignment with the sub-passage, and a control member having a knob and a shank which is inserted through the casing and received in the radial passage in the valve, a first path defined radially through the shank and communicating with the main passage, a second path defined radially in the shank and terminated at a half way of the shank, the first path communicating with the second path and an angle defined between two respective axes of the first path and the second path, the second path being sealed by an inner periphery of the radial passage when the control member being located at a first position, the second path communicating with the sub-passage when the control member being located at a second position.

2. The test assembly as claimed in claim 1 further comprising a groove defined longitudinally in an outer periphery of the shank of the control member and communicating with the main passage and outside of the casing when the control member is located at the second position.

3. The test assembly as claimed in claim 1 further comprising an annular groove defined in an outer periphery of the first end of the valve and the seal film having a skirt which has a clamp flange extending radially inward from an edge of the skirt portion, the clamp flange engaged with the annular groove.

4. The test assembly as claimed in claim 1 wherein one of two open ends of the first path in the shank of the control member is sealed and an open end defined by the second path in the shank of the control member is sealed.

* * * * *